Figure 3:
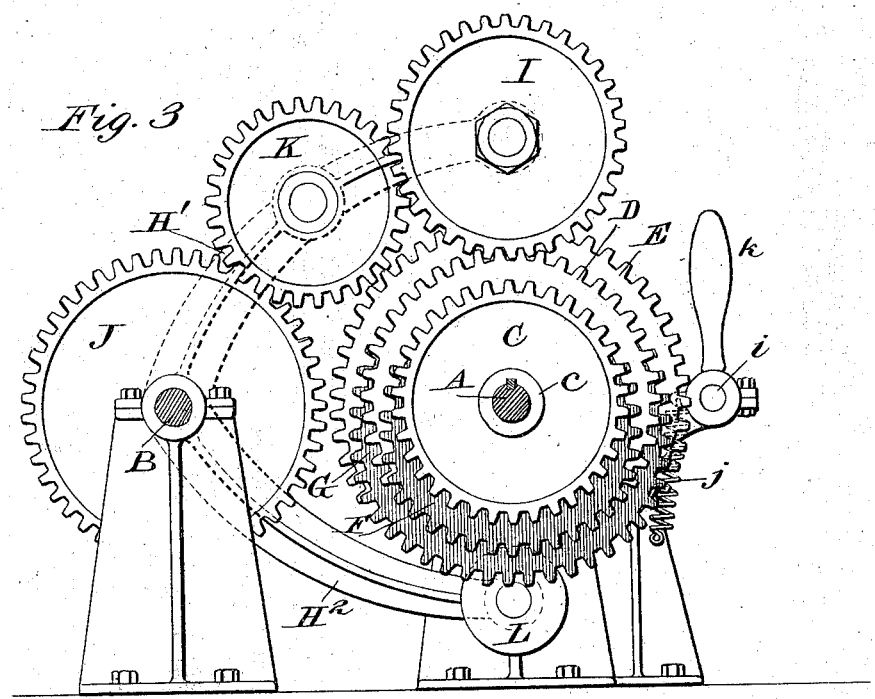

No. 611,378. Patented Sept. 27, 1898.
R. N. DYER.
VARIABLE GEARING.
(Application filed Apr. 23, 1898.)
(No Model.) 3 Sheets—Sheet 1.
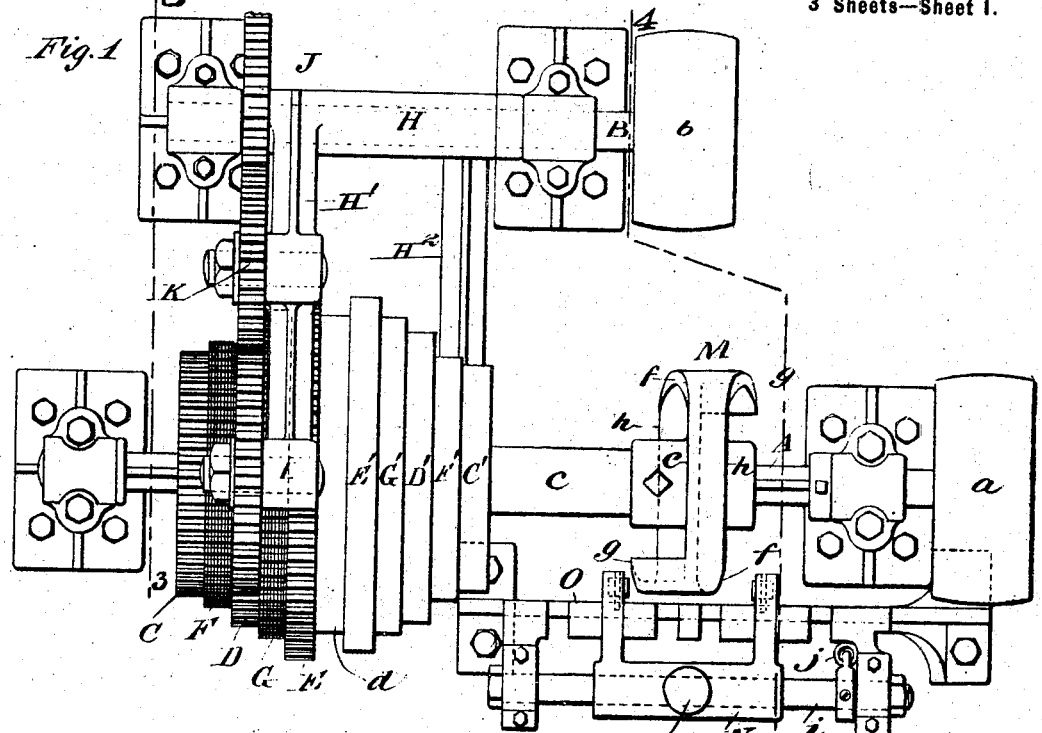
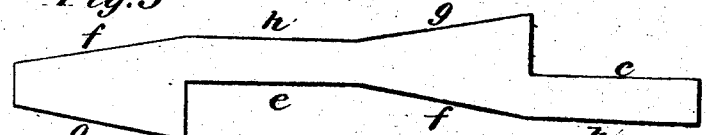
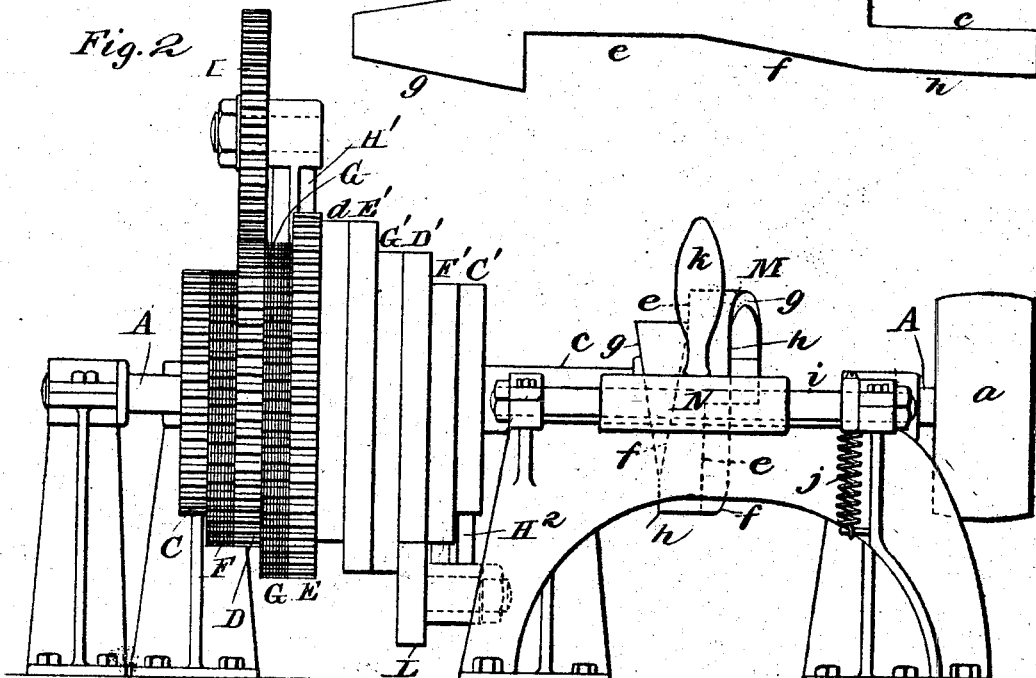
Witnesses: Inventor
Richard N. Dyer.

No. 611,378. Patented Sept. 27, 1898.
R. N. DYER.
VARIABLE GEARING.
(Application filed Apr. 23, 1898.)
(No Model.) 3 Sheets—Sheet 3.
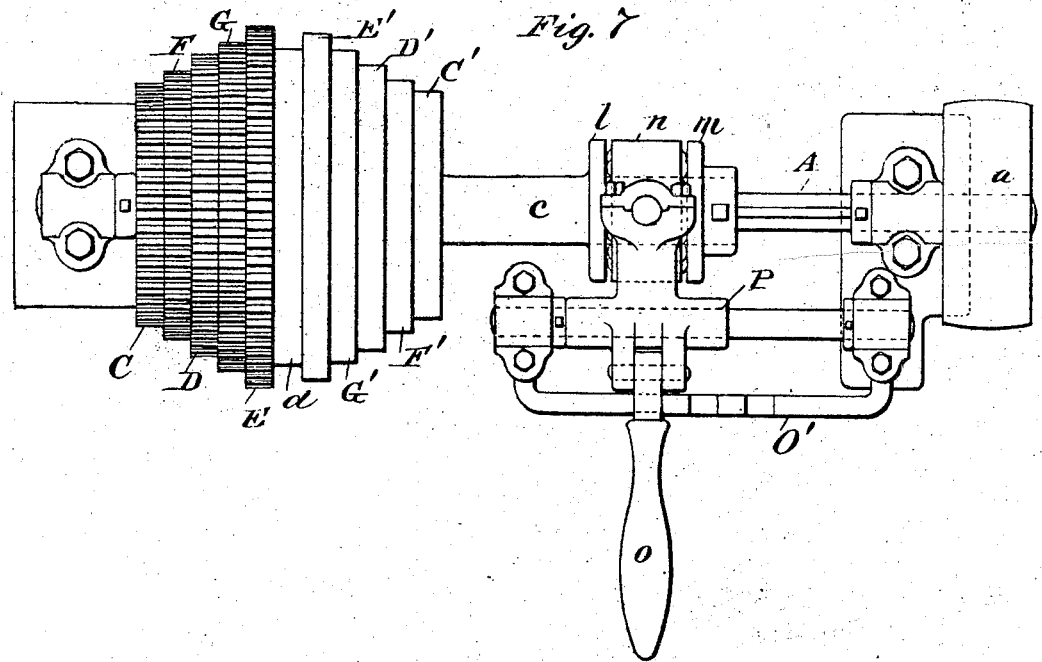
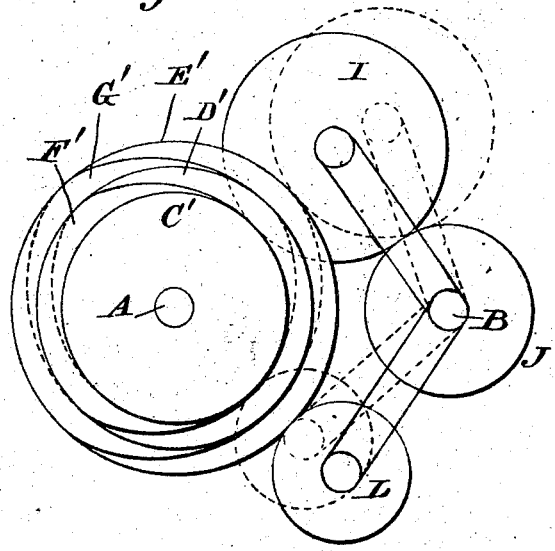
Witnesses: Inventor
Richard N. Dyer.

United States Patent Office.

RICHARD N. DYER, OF EAST ORANGE, NEW JERSEY.

VARIABLE GEARING.

SPECIFICATION forming part of Letters Patent No. 611,378, dated September 27, 1898.

Application filed April 23, 1898. Serial No. 678,587. (No model.)

*To all whom it may concern:*

Be it known that I, RICHARD N. DYER, a citizen of the United States, residing in the township of East Orange, county of Essex, and State of New Jersey, have invented a certain new and useful Improvement in Variable Gearing, of which the following is a specification.

The object I have in view is to produce a simple and effective gearing capable of adjustment to varying speed or power relations which will transmit motion positively at all times, even during the periods of adjustment. This I accomplish by constructing one element of the gearing with two or more adjoining toothed gear-wheels of different diameters, but having coincident portions at which the shifting from one speed to another is effected. If the lateral shifting of one element of the gearing with relation to the other element is effected while the engagement of the two elements of the gearing is within the limits of the coincident portions of two adjoining gears, the power will be transmitted from one element of the gearing to the other positively and without break.

In the preferred construction of my gearing I place side by side two or more concentric gear-wheels, (the number being determined by the number of changes in speed or power desired for any particular purpose,) such gear-wheels being of different diameters to give the different speed or power relations desired. Between each concentric gear-wheel and the next adjoining concentric gear-wheel I place an eccentric or cam gear-wheel, which is coincident at different portions of its perimeter with both of the concentric gear-wheels, and between these portions, which are coincident with the adjoining concentric gears of different size, the eccentric gear has two cam-surfaces which connect such portions. In other words, considering the relation of an eccentric or cam gear to two adjoining concentric gear-wheels differing in size, the perimeter of the eccentric gear has two concentric portions, one coincident with the smaller gear-wheel and the other coincident with the larger gear-wheel, and between these concentric portions the eccentric gear has two cam-surfaces which connect the concentric portions of its perimeter, one rising from the smaller wheel to the larger wheel and the other falling from the larger wheel to the smaller wheel. The division of the perimeter of the eccentric gear-wheel between the two concentric and two cam portions may be equal or unequal—*i. e.*, each may occupy one-quarter of the whole perimeter or a greater space may be given to the concentric portions than to the cam portions, or vice versa, or the rising cam may occupy a greater length of the perimeter than the falling cam, all according to the particular character of work to which the gearing may be applied.

The two or more concentric gear-wheels and one or more intermediate eccentric gear-wheels are clamped together side by side with their teeth registering throughout coincident portions or are built together as a single structure and form one element of the gearing, such element being mounted directly upon or sleeved upon the driving or the driven shaft. The other element of the gearing is a toothed wheel carried by an arm or frame swung upon another shaft parallel with the first shaft, such toothed wheel engaging with the wheels of the first element and adapted by means of its swinging support to move toward or away from the axis of the first element to accommodate itself to the different diameters of the wheels of the first element. Motion is transmitted between the toothed wheel of the second element and the shaft upon which it is supported by any suitable means which will permit the swinging movement, as by gear-wheels, a chain, and sprocket-wheels or other device. Either element of the gear may be the driving element and either may be arranged to be shifted laterally, so as to cause the wheel of the second element to be transferred from one of the concentric gears to another over one of the cam-surfaces of an eccentric gear. This lateral shifting may be effected by the power itself through a suitable cam or by the direct throw of a lever.

To maintain the toothed wheel of the second element in engagement with the toothed concentric and eccentric wheels of the first element of the gearing, I provide adjoining the wheels of the first element and turning therewith another set of similar concentric and eccentric wheels having toothed or smooth surfaces, but preferably the latter, and with this second set of concentric and eccentric wheels engages a wheel on an arm extending from or connected with the swinging frame of the second element of the gearing, so that the movement of this holding-wheel away from the axis of the first element of the gearing can only be accomplished by a corresponding movement toward that axis of the engaging toothed wheel of the second element of the gearing. By a proper adjustment of the smooth wheels the operative engagement between the two elements of gearing is thus maintained. The toothed and smooth wheels of the second element of the gearing also lock the gearing against lateral shifting except at the coincident portions of the gears of the first element.

Figure 4:
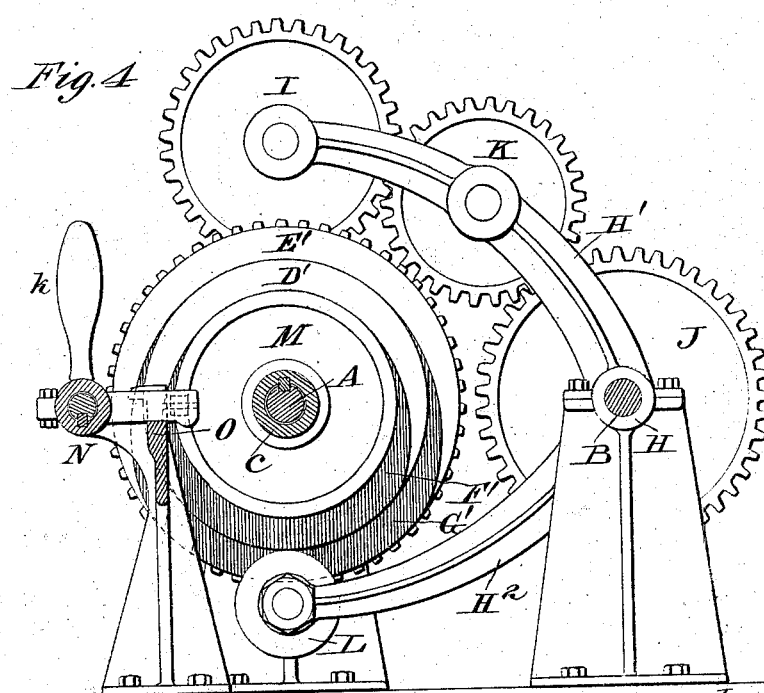

In the accompanying drawings, Figure 1 is a plan view illustrating a variable gearing embodying my invention. Fig. 2 is a side view of the same. Fig. 3 is a vertical section taken on line 3 3 in Fig. 1. Fig. 4 is a vertical section taken on line 4 4 in Fig. 1. Fig. 5 is a view of the shifting cam developed. Fig. 6 is an end elevation illustrating a different adjustment of the toothed and smooth eccentric wheels of the first element of the gearing, and Fig. 7 is a plan view illustrating the lateral shifting of the gearing by the direct throw of a lever.

Referring particularly to Figs. 1 to 5, A and B are two shafts mounted in suitable bearings. Pulleys $a\,b$ are shown as conventional illustrations of any means for applying power to or taking it from either shaft. The first element of the gearing is composed of a set of concentric gear-wheels C D E and eccentric gear-wheels F G, the latter being shaded in the drawings to readily distinguish them from the concentric gear-wheels. The eccentric gear-wheels have concentric portions coincident with the adjoining gear-wheels and cam portions connecting the eccentric portions, as already explained and as illustrated in Figs. 2 and 3. These concentric and eccentric gears are mounted on a sleeve $c$, splined on the shaft A and turning therewith, but capable of longitudinal movement thereon. Mounted on the same sleeve are a similar set of concentric and eccentric smooth wheels C' D' E' F' G', and between the sets of toothed and smooth wheels is a weight $d$ to balance the wheels.

Upon the shaft B is a sleeve H capable of turning on the shaft, but held against longitudinal movement. This sleeve carries an arm H', projecting over the first element of the gearing, and mounted on that arm is the toothed wheel I, engaging the concentric and eccentric gears C D E F G. The wheel I is geared with a wheel J, keyed on the shaft B by an intermediate gear K, carried by the arm H'. Projecting from the sleeve H under the first element of the gearing is an arm $H^2$, carrying a smooth wheel L, engaging the concentric and eccentric smooth wheels C' D' E' F' G' and serving to maintain the operative engagement of the wheel I and also coöperating with the wheel I to prevent the shifting of the gearing except at the coincident portions of the gears.

In the construction illustrated the first element of the gear is shifted laterally. This is accomplished by mounting upon the sleeve $c$ a cam-wheel M, having on opposite sides of its circumference an initial straight portion $e$, two inclined portions $f$ and $g$, and intermediate straight portions $h$. (See Fig. 5.) With this cam engage the arms of a fork N, which fork is sleeved on a turning shaft $i$, so as to have a free longitudinal movement on said shaft, but held by a spline so as to turn with the shaft. The arms of the fork rest normally in slots in a comb O, these slots being the proper distance apart for the three adjustments of the gearing which are illustrated. The shaft $i$ is turned in one direction by a spring $j$, so as to throw the fork normally into engagement with the slots of the comb. The fork is moved by means of a handle $k$. In order to shift the gearing, the fork is rocked by its handle so as to be disengaged from the comb and is then shifted laterally until the fork engages the next set of slots in the comb. One of the arms of the fork will ride on the periphery of the cam-wheel M until the straight portion $e$ of the cam is reached, when the fork will drop into the comb, and that arm of the fork will then engage the incline $f$ on one side of the cam, shifting the first element of the gearing so as to bring an eccentric gear into mesh with the toothed wheel of the second element of the gearing. While this toothed wheel is rising or falling on the eccentric gear the straight portion $h$ of the cam will be in contact with the arm of the fork. The coincident portion of the gearing being reached, the incline $g$ of the cam will complete the lateral movement. The teeth of the comb should have a sufficient length to permit the lateral movement of the fork only when the arms of the fork are completely disengaged from the cam.

Instead of providing a cam movement to effect the lateral shifting of the gearing and utilizing the power to do the work in shifting, the shifting may be done directly by a hand-lever, as illustrated in Fig. 7, in which the sleeve $c$ is provided with flanges $l\,m$, between which is a collar $n$, connected by a yoke with a sliding block P, whose movement is effected by a handle $o$, which handle is pivoted to the block and works in the teeth of a comb O'.

As already stated, the toothed wheel I of the second element of the gearing may be connected with the shaft B by any suitable means which will permit the swinging movement. In Fig. 6 is illustrated the direct meshing of the gear J with the gear I on the shaft B. In this case the gear I and smooth wheel L are shown as placed a quarter of a revolution apart instead of a half a revolution. This makes it necessary that the eccentric toothed, and smooth wheels of the first element of the gearing should be placed a quarter of a revolution apart. The wheels I and L may be even closer together and the shaft B brought closer to the shaft A, the eccentric, toothed, and smooth wheels being properly adjusted with relation to each other and to the wheels I and L, so that the movement of the wheels I and L toward and away from the shaft A shall be equal and opposite.

What I claim is—

1. A variable gear having coöperating gear-wheel elements, one of such elements being provided with toothed wheels of different sizes having coincident portions at which the adjustment from one speed to another takes place, substantially as set forth.

2. A variable gear having coöperating gear-wheel elements and in which one of such elements is provided with two or more concentric gear-wheels of different diameters, and means for transferring the engaging wheel of the other element of the gear from one of the concentric gear-wheels to the other without interruption in the transmission of power through the gearing, substantially as set forth.

3. A variable gear having coöperating gear-wheel elements, and in which one of such elements is provided with two or more concentric gear-wheels of different diameters and one or more intermediate eccentric or cam gear-wheels for transferring the engaging wheel of the other element of the gear from one of the concentric gear-wheels to the other without interruption in the transmission of power through the gearing, substantially as set forth.

4. In a variable gear, the combination of one element of the gearing provided with gear-wheels of different sizes rotating together and having coincident portions, with the other element of the gearing provided with a toothed wheel engaging the gears of the first element and mounted so as to move toward and away from the axis of the first element, substantially as set forth.

5. In a variable gear, the combination of one element of the gearing provided with gear-wheels of different sizes rotating together and having coincident portions, with the other element of the gearing provided with a toothed wheel engaging the gears of the first element and mounted so as to move toward and away from the axis of the first element, and means for effecting a relative lateral shifting of the elements of the gear at the coincident portions, substantially as set forth.

6. In a variable gear, the combination of one element provided with two or more concentric gear-wheels of different diameters and one or more intermediate eccentric gear-wheels, all rotating together, the eccentric gear-wheels having portions coincident with the adjoining concentric gear-wheels and intermediate cam portions connecting the coincident portions, with the other element of the gear provided with a toothed wheel engaging the gears of the first element and mounted upon a swinging frame so as to be capable of movement toward and away from the axis of the first element, substantially as set forth.

7. In a variable gearing, the combination of one element provided with a number of gear-wheels of different sizes mounted to turn together and having coincident portions, of the other element provided with a toothed wheel mounted so as to move toward and away from the axis of the first element, and means for maintaining the engagement of the toothed wheels of the two elements, substantially as set forth.

8. In a variable gear, the combination of one element provided with gear-wheels of different diameters having coincident portions rotating together and also provided with another set of similarly-arranged wheels, with the second element of the gearing having a toothed wheel engaging the toothed wheels of the first set and mounted so as to move toward and away from the axis of the first element and provided with another wheel engaging the second set of wheels of the first element and maintaining the engagement between the two elements, substantially as set forth.

9. In a variable gearing, the combination of one element provided with gear-wheels of different diameters having coincident portions and provided with a second set of wheels similarly arranged, with the second element of the gearing having a toothed wheel mounted on a swinging frame, and another wheel mounted on the same frame and engaging the second set of wheels of the first element in such manner as to maintain the operative engagement of the two elements, substantially as set forth.

10. In a variable gearing, the combination of one element provided with two or more concentric gear-wheels and one or more intermediate eccentric gear-wheels having portions coincident with the concentric gear-wheels and cam portions connecting the coincident portions, and also provided with a second set of wheels similarly arranged, with the second element of the gearing having a toothed wheel mounted in a swinging frame and engaging with the concentric and eccentric wheels of the first element, and also provided with a wheel mounted on the swinging frame engaging the second set of wheels of the first element and maintaining the engagement of the two elements, substantially as set forth.

11. In a variable gearing, the combination of one element provided with gear-wheels of different diameters having coincident portions, with the second element provided with a toothed wheel engaging the wheels of the first element and mounted to move toward and away from the axis of the first element, and a cam arranged to move the first element laterally while the engagement between the two elements is at the coincident portions of the wheels of the first element, substantially as set forth.

12. In a variable gearing, the combination of one element provided with gear-wheels of different diameters having coincident portions and mounted to move laterally, with the second element having a toothed wheel engaging the wheels of the first element and mounted to move toward and away from the axis of the first element, a cam for shifting the first element laterally, and a fork engaging a comb-plate acting on the cam to produce the lateral shifting, substantially as set forth.

This specification signed and witnessed this 21st day of April, 1898.

RICHARD N. DYER.

Witnesses:
S. O. EDMONDS,
JNO. R. TAYLOR.